US009366357B2

(12) United States Patent
Zieger et al.

(10) Patent No.: US 9,366,357 B2
(45) Date of Patent: Jun. 14, 2016

(54) ELECTROMAGNETIC VALVE FOR A TANK VALVE OF A FUEL SUPPLY SYSTEM

(71) Applicant: Hyptec GmbH, Lebring (AT)

(72) Inventors: Andreas Zieger, Hofstätten an der Raab (AT); Thomas Höller, Lebring (AT)

(73) Assignee: Hyptec GmbH, Lebring (AT)

( * ) Notice: Subject to any disclaimer, the term of this patent is extended or adjusted under 35 U.S.C. 154(b) by 0 days.

(21) Appl. No.: 13/866,959

(22) Filed: Apr. 19, 2013

(65) Prior Publication Data

US 2013/0277587 A1    Oct. 24, 2013

(30) Foreign Application Priority Data

Apr. 20, 2012    (DE) .......................... 10 2012 206 604

(51) Int. Cl.
| | |
|---|---|
| F16K 31/12 | (2006.01) |
| F16K 31/06 | (2006.01) |
| F16K 39/02 | (2006.01) |
| F16K 27/02 | (2006.01) |
| F02M 21/02 | (2006.01) |

(52) U.S. Cl.
CPC ........ *F16K 31/0675* (2013.01); *F02M 21/0242* (2013.01); *F16K 27/029* (2013.01); *F16K 31/0651* (2013.01); *F16K 31/0655* (2013.01); *F16K 39/024* (2013.01); *F02M 21/0221* (2013.01); *F16K 31/0658* (2013.01); *Y02T 10/32* (2013.01)

(58) Field of Classification Search
CPC ............ F16K 31/0658; F16K 31/0675; F16K 39/024; F16K 27/029; F16K 31/0655; F16K 31/0651; Y02T 10/32; F02M 21/0242; F02M 21/0221

USPC ............................................. 251/30.01–30.04
See application file for complete search history.

(56) References Cited

U.S. PATENT DOCUMENTS

| | | | | |
|---|---|---|---|---|
| 2,914,086 | A | * | 11/1959 | Beller ............................. 55/309 |
| 3,405,906 | A | * | 10/1968 | Keller ......................... 251/30.04 |
| 3,872,878 | A | * | 3/1975 | Kozel et al. .................... 137/242 |
| 4,082,116 | A | * | 4/1978 | Stampfli .................. 137/630.14 |

(Continued)

FOREIGN PATENT DOCUMENTS

| | | |
|---|---|---|
| CA | 2802182 A1 | 12/2011 |
| DE | 601 02 241 T2 | 2/2005 |

(Continued)

OTHER PUBLICATIONS

European Search Report from European Application No. 13 160 009.0. Dated Dec. 18, 2013. 4 pages.

*Primary Examiner* — Marina Tietjen
*Assistant Examiner* — Umashankar Venkatesan
(74) *Attorney, Agent, or Firm* — Kilpatrick Townsend & Stockton LLP

(57) ABSTRACT

The present invention relates to an electromagnetic valve for a tank valve of a fuel supply system of a gas fuel motor vehicle, comprising a magnetic coil with an inner guide, and a magnetic armature which can move axially in the inner guide. The magnetic anchor consists of an anchor, a seal element which is arranged between the anchor and a fuel inlet, and a counter pole which abuts the seal element. The present invention also relates to such a tank valve and to a fuel supply system having such an electromagnetic valve.

18 Claims, 14 Drawing Sheets

(56) References Cited

U.S. PATENT DOCUMENTS

| | | | | |
|---|---|---|---|---|
| 4,248,270 A | * | 2/1981 | Ostrowski | 138/45 |
| 4,500,067 A | * | 2/1985 | Zukausky | 251/38 |
| 5,188,017 A | * | 2/1993 | Grant et al. | 91/459 |
| 5,205,531 A | * | 4/1993 | Kolchinsky | 251/30.04 |
| 5,209,265 A | * | 5/1993 | Taguri et al. | 138/45 |
| 5,452,738 A | * | 9/1995 | Borland et al. | 137/265 |
| 5,711,583 A | * | 1/1998 | Bareiss et al. | 303/119.2 |
| 5,735,582 A | * | 4/1998 | Eith et al. | 303/119.2 |
| 5,813,652 A | * | 9/1998 | Richmond et al. | 251/127 |
| 5,820,102 A | * | 10/1998 | Borland | 251/144 |
| 6,739,578 B2 | * | 5/2004 | Barton et al. | 251/149.9 |
| 7,481,412 B2 | * | 1/2009 | Ishikawa et al. | 251/30.04 |
| 2009/0194727 A1 | * | 8/2009 | Platz et al. | 251/335.3 |
| 2013/0175462 A1 | * | 7/2013 | Suzuki et al. | 251/30.01 |

FOREIGN PATENT DOCUMENTS

| | | |
|---|---|---|
| DE | 103 61 781 B4 | 9/2005 |
| DE | 102010026548 A1 | 1/2012 |
| WO | 2010/029359 A1 | 3/2010 |

* cited by examiner

Figure 2:
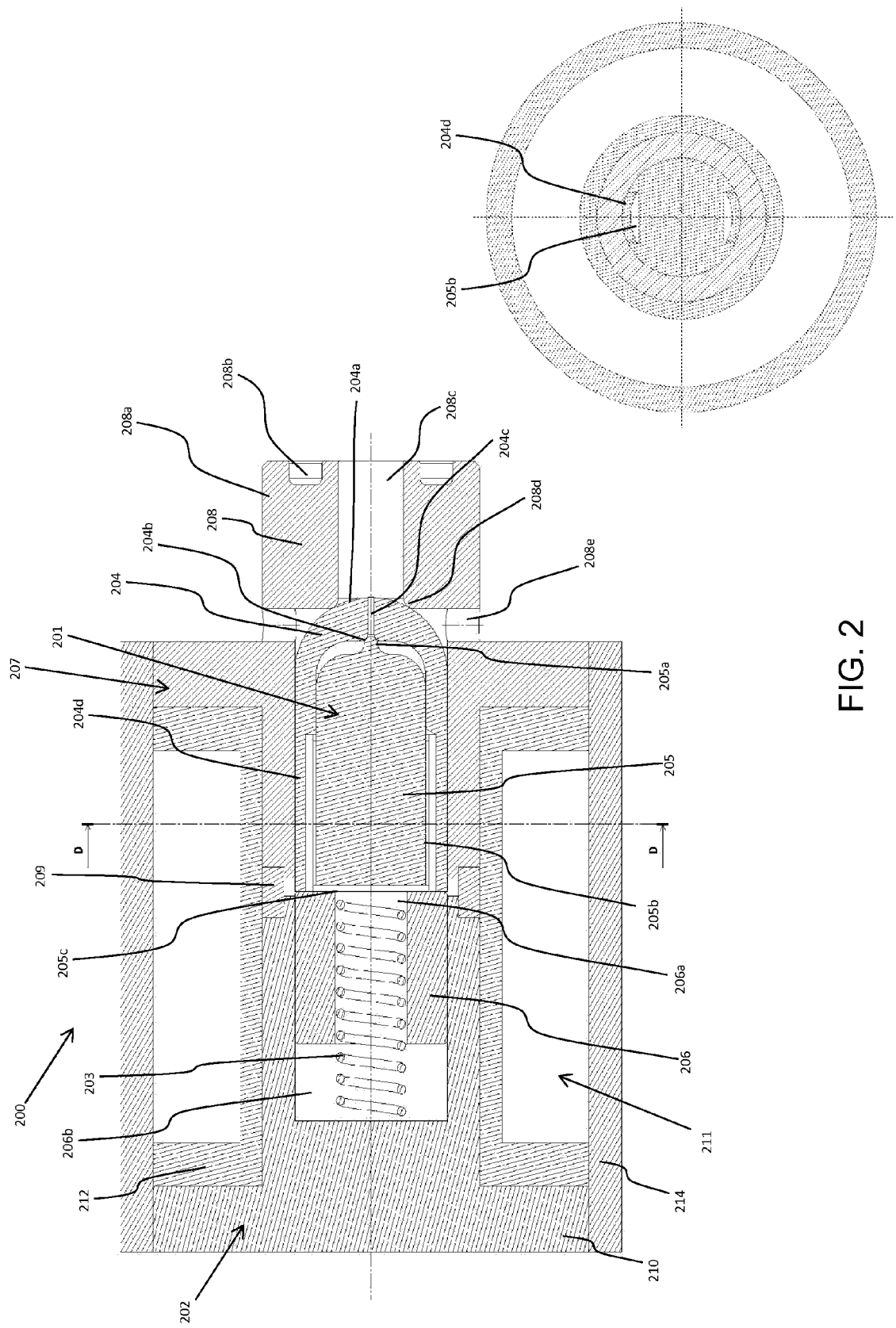

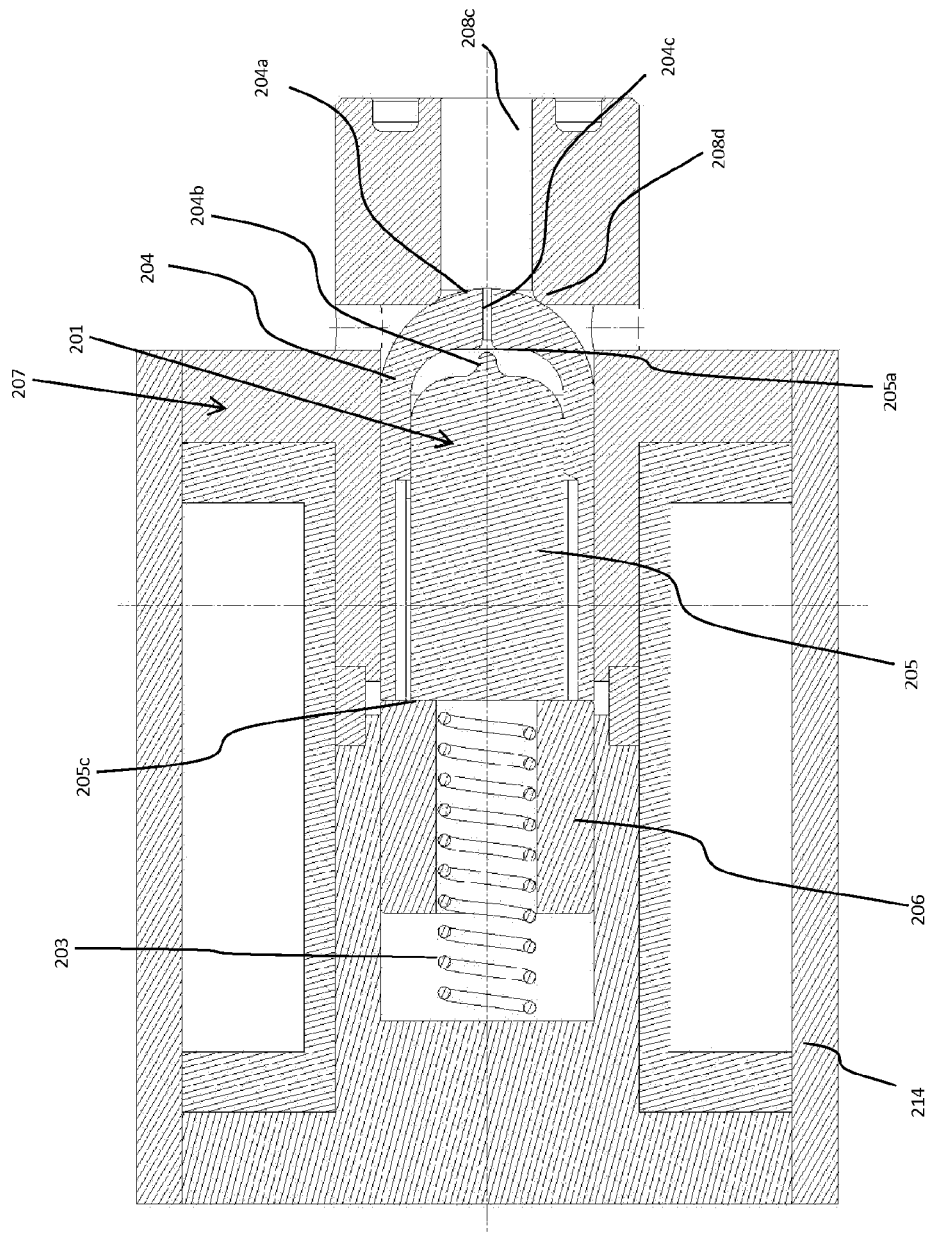
FIG. 2.1

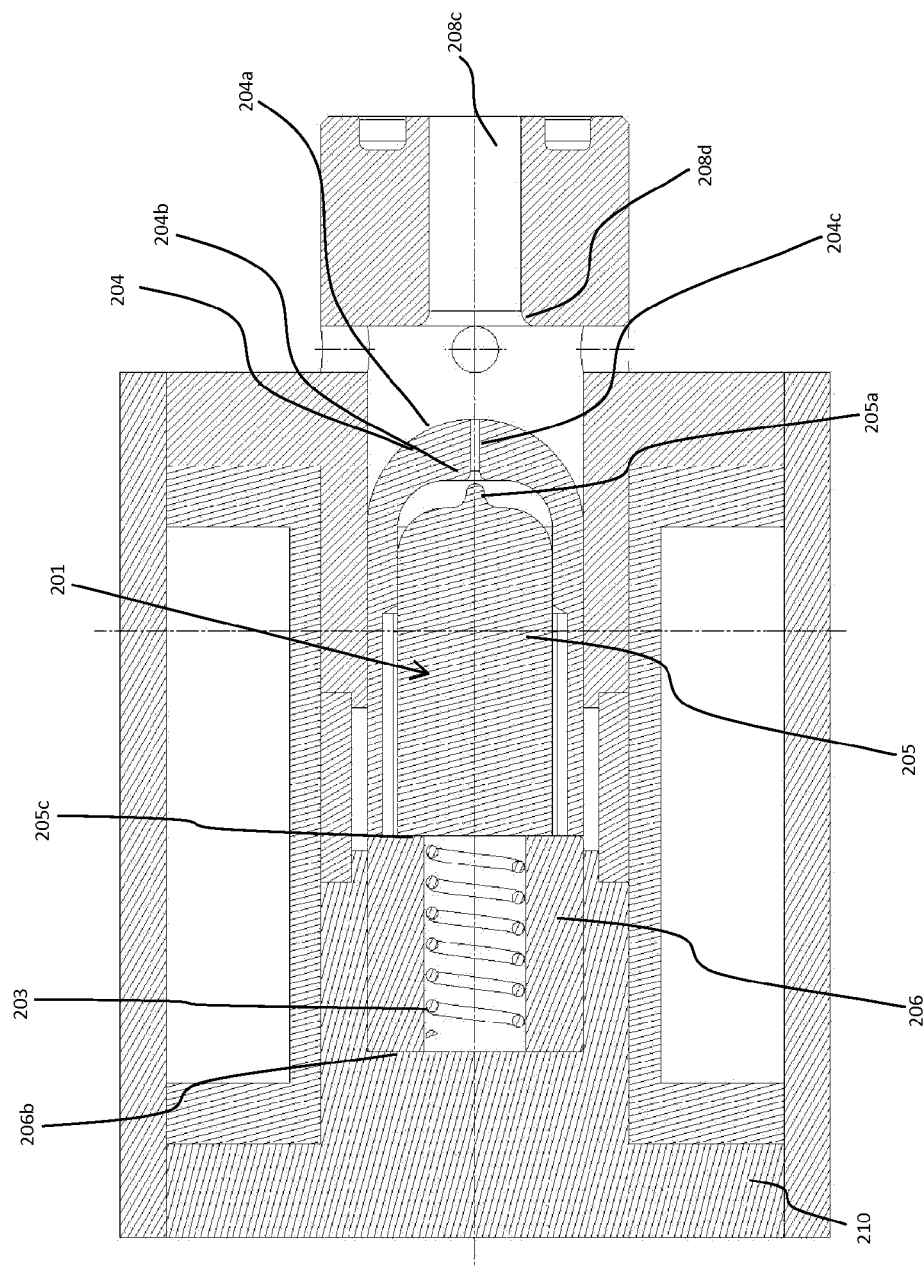
FIG. 2.2

Figure 7:
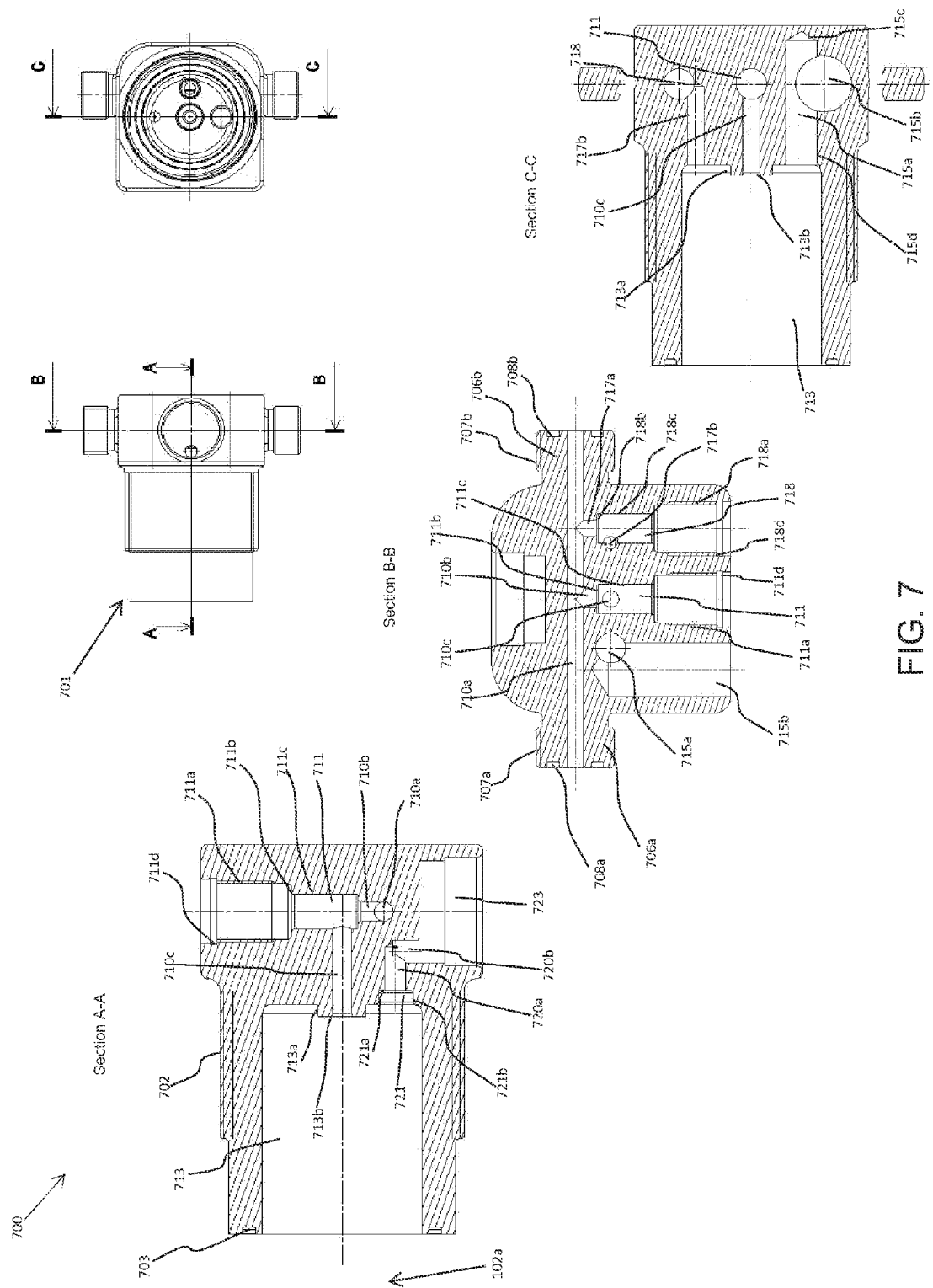

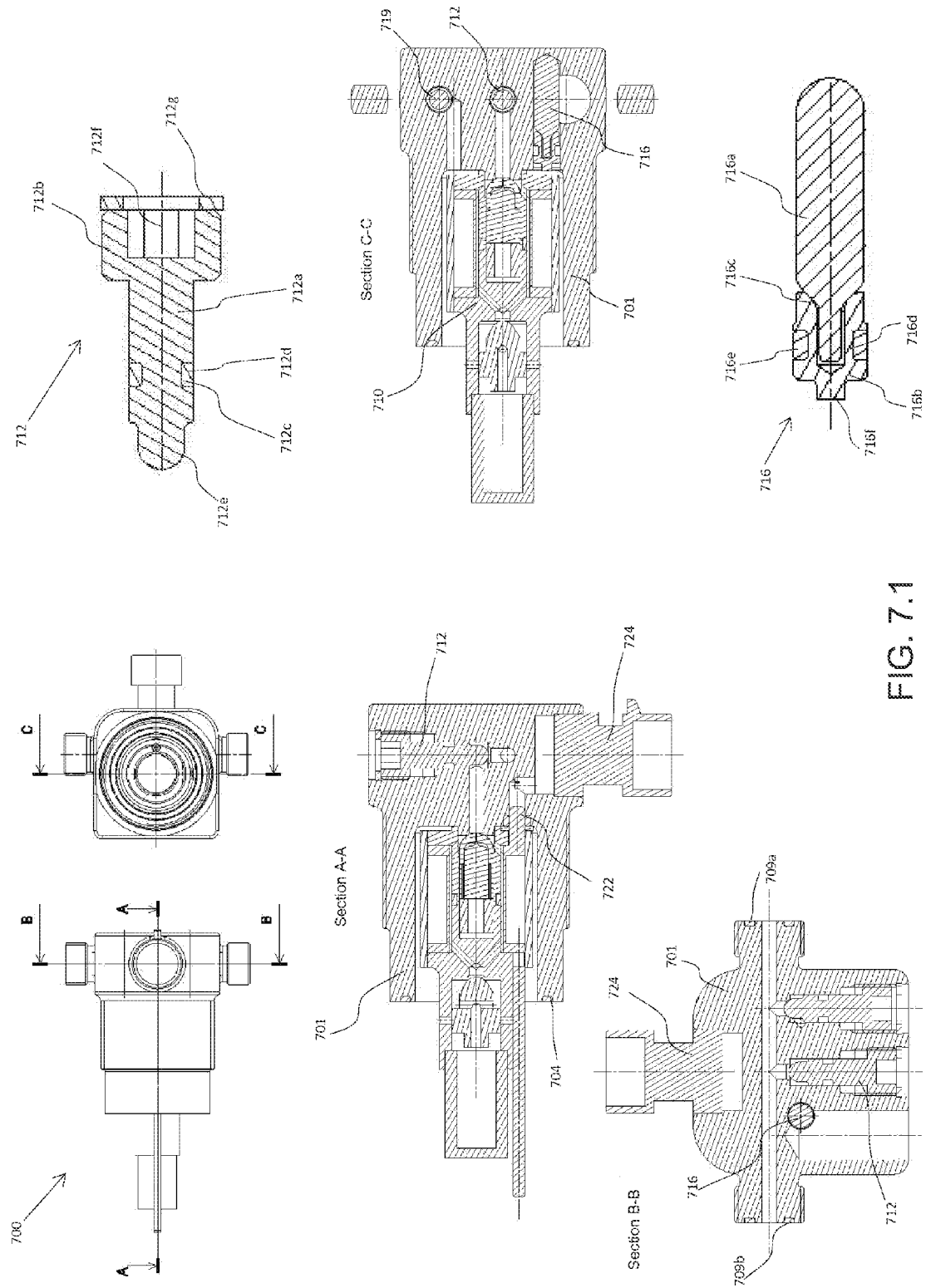
FIG. 7.1

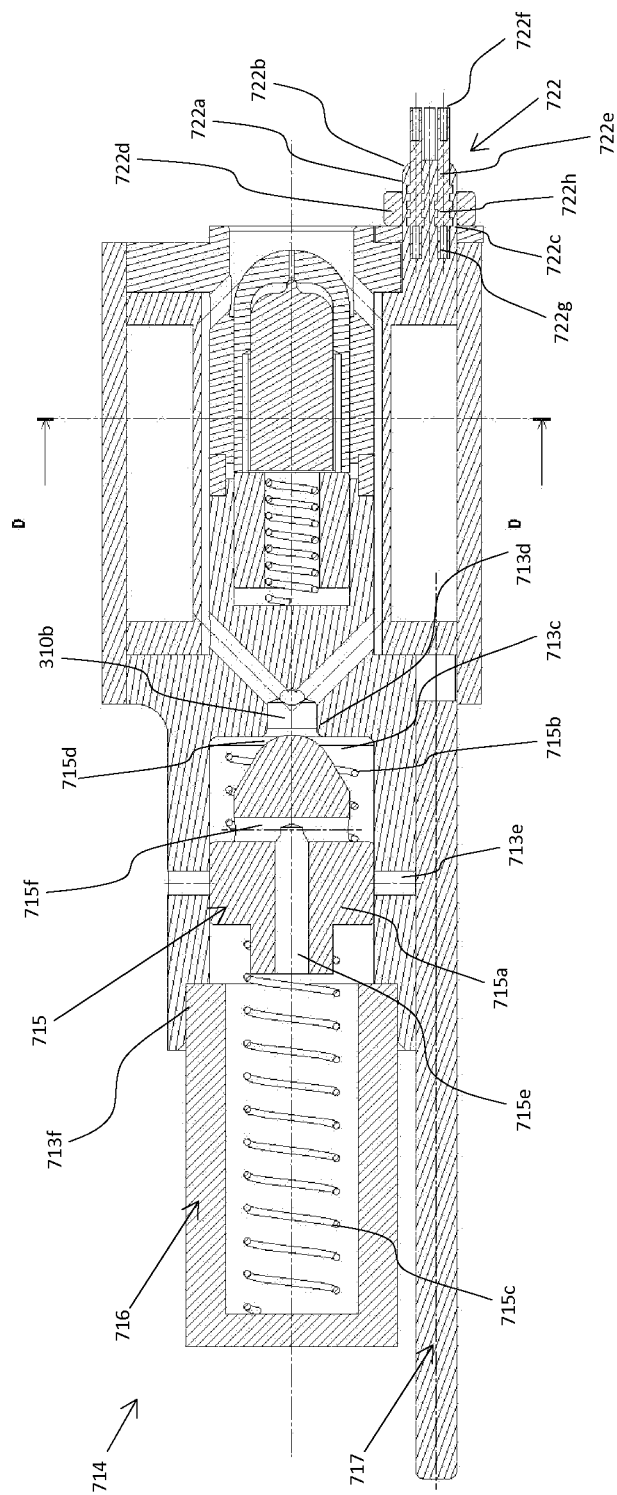
FIG. 7.2

ELECTROMAGNETIC VALVE FOR A TANK VALVE OF A FUEL SUPPLY SYSTEM

CROSS-REFERENCE TO RELATED APPLICATION

This application claims the priority of German Application No. 10 2012 206 604.7, filed on Apr. 20, 2012, the disclosure of which is incorporated herein by reference.

The present invention relates to an electromagnetic valve for a tank valve of a fuel supply system, for the purpose of feeding a gaseous fuel to a storage tank, and supplying a consumer with gaseous fuel from this storage tank. The present invention further relates to such a tank valve, and to a fuel supply system having such an electromagnetic valve.

Alternative gaseous energy sources such as natural gas, methane, biogas, and hydrogen are currently increasing in significance in the transportation industry due to the potential savings in $CO_2$ and for reasons of supply security. These energy sources are typically stored in a compressed form in pressure cylinders at nominal pressures of up to 700 bar, and supplied to the consumer at a working pressure of approx. 10 bar, in order to achieve the required travel range.

The electromagnetic valve controls the flow of gas during filling of the tank and during operation of the vehicle, and is an essential component of a tank valve, the same containing additional safety elements, such as pressure relief safeguards and/or thermal protection for the purpose of protecting the storage tank from unacceptably high pressures or from fire, flow limiters for the purpose of protection from unacceptably large gas flow volumes following the failure of an external component, switch elements such as a manual blocking valve, for example, for the purpose of halting the gas flow, service valves for the purpose of manually emptying the storage tank, auxiliary elements such as a filter element, for example, for the purpose of protecting the switch elements from contamination, check valves for maintaining pressure, temperature sensors for measuring the gas temperature in the tank, and the like, for example, and complies with high safety requirements for the external application of force.

Various different embodiments of electromagnetic valves are known to a person skilled in the art, wherein the functionality and arrangement thereof determine the shape and size of the tank valve.

A pilot-operated electromagnetic valve with a single-piece armature is known from U.S. Pat. No. 5,188,017, intended for external attachment: the advantages thereof are the simple construction of the electromagnetic valve and the simple bore hole pattern of the tank valve. The disadvantages are the constructed size of the electromagnetic valve and of the tank valve due to the size of the magnetic coil, the energy consumption of the electromagnetic valve due to the single-piece armature, the absence of protection from the external application of force and from non-standard manipulation, and the low storage volume of the tank due to the large constructed height of the tank valve.

A tank valve having a pilot-operated electromagnetic valve for internal installation, having a single-piece armature, is known from DE 601 02 241: the advantages thereof are the protection from the external application of force and from non-standard manipulation, and the simple bore hole pattern of the tank valve. The disadvantages thereof are the complexity of the construction due to the number of components of the electromagnetic valve, and the energy consumption of the electromagnetic valve due to the single-piece armature.

A pilot-operated electromagnetic valve for internal installation, having movable poles, is known from DE 103 61 781: the advantages thereof are the protection from the external application of force, and the energy consumption of the electromagnetic valve due to the movable counter pole. The disadvantages thereof are the complexity of construction for the electromagnetic valve due to the number of components, the complexity of construction and the constructed size of the tank valve due to the cross-borings which must be closed due to the longitudinal installation with outside access, and the lack of protection from non-standard manipulation.

The present invention addresses the problem of avoiding the disadvantages of the prior art, and of creating an electromagnetic valve and/or a tank valve with a compact and simple construction, having—among other things—some or all of the following features:

a compact structural form and low energy consumption for the electromagnetic valve, due to the selected functional principle a simple construction of the electromagnetic valve due to the low number of components protection from the external application of force, and from non-standard manipulation, due to the arrangement of the electromagnetic valve in the interior of the storage tank a compact construction of the tank valve, with a simple bore hole pattern, due to the arrangement of the electromagnetic valve in the interior of the storage tank The technical problem of the present invention is addressed by the subject matter of the independent claims. Further embodiments of the invention are found in the dependent claims.

The electromagnetic valve for a storage tank of a fuel supply system of a gas-fuel motor vehicle according to the invention has a magnetic coil with an internal guide and a magnetic armature which can move axially in the internal guide. The magnetic armature consists of an armature, a seal element which is arranged between the armature and a fuel inlet, and a counter pole which abuts the seal element.

The magnetic coil preferably includes an attachment component, the inner guide, an outer guide, and a closure plate. The electromagnetic valve preferably further includes an elastic element which preferably presses the armature against the seal element and the seal element against a seal surface when the magnetic coil is not excited.

In other words, the problem is addressed, by way of example, by a pilot-operated electromagnetic valve with a movable counter pole, and with no housing, wherein the movable magnetic armature thereof consists only of a seal element, an armature, and a counter pole, guided through the inner guide of the magnetic coil, wherein the counter pole abuts the seal element and forms the first working air gap with the armature, which is preferably at least partially encompassed by the seal element, for the purpose of opening the pilot hole by means of lifting the armature off the pilot seal surface, and wherein the counter pole forms the second working air gap with the inner guide in the axial direction, for the purpose of opening the inlet by means of lifting the seal element from the primary seal surface.

As a result of the design using a moving counter pole, the pilot control lifting movement to open the pilot hole is independent of the primary lifting movement to open the primary hole, such that a low electrical current is required to open the pilot hole with the small first working air gap, and a large cross-section for flow is achieved with the large second working air gap, with minimal throttle drag. As a result of the direct guidance of the magnetic armature in the inner guide of the magnetic coil, which specifically carries the magnetic field to and/or away from the magnetic armature, the energy consumption of the electromagnetic valve is further reduced. As a result of installing the electromagnetic valve inside the high-pressure chamber of the storage tank, there is no need for a housing which holds pressure. This facilitates the propagation of the magnetic field, while nevertheless ensuring protection from the external application of force and from non-standard manipulation. As a result of the simple construction of the magnetic armature out of three parts (armature, seal element, counter pole) and the absence of the pressure-resistant housing, the weight and cost of the electromagnetic valve are reduced.

The magnetic coil and the magnetic armature are preferably arranged in such a manner that, when the magnetic coil is activated, first a pilot opening for the fuel is opened by means of the armature sliding in the direction of the counter pole, and by means of the armature separating from the seal element, and next a primary opening for the fuel is opened by means of the magnetic armature sliding in the direction of a closure plate of the magnetic coil and by means of the separation of the seal element from the fuel inlet.

The first working air gap is preferably smaller than the second working air gap, such that the first working air gap is, by way of example, between 50 and 0.5%, and preferably between 25 and 0.01% of the length of the second working air gap. The pilot opening preferably has a smaller flow cross-section than the primary opening, wherein said cross-section is preferably between 25 and 0.05%, and preferably between 15 and 1% of the flow cross-section of the primary opening.

The present invention further relates to such a tank valve, and to a fuel supply system having such an electromagnetic valve. The present invention further relates to a flow restrictor for such a fuel supply system, consisting of a valve body with an integrated filter element.

Figure 1:
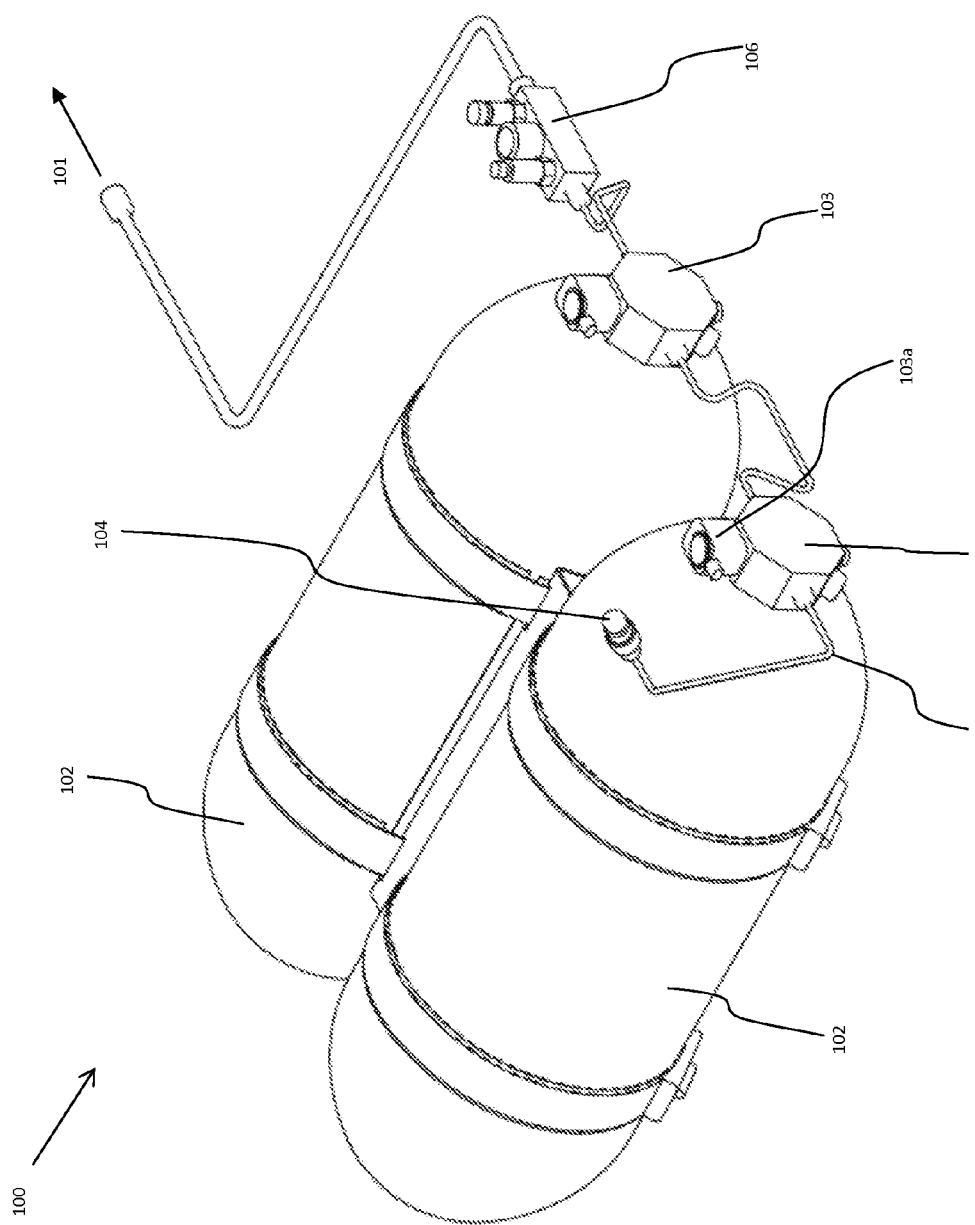
Figure 3:
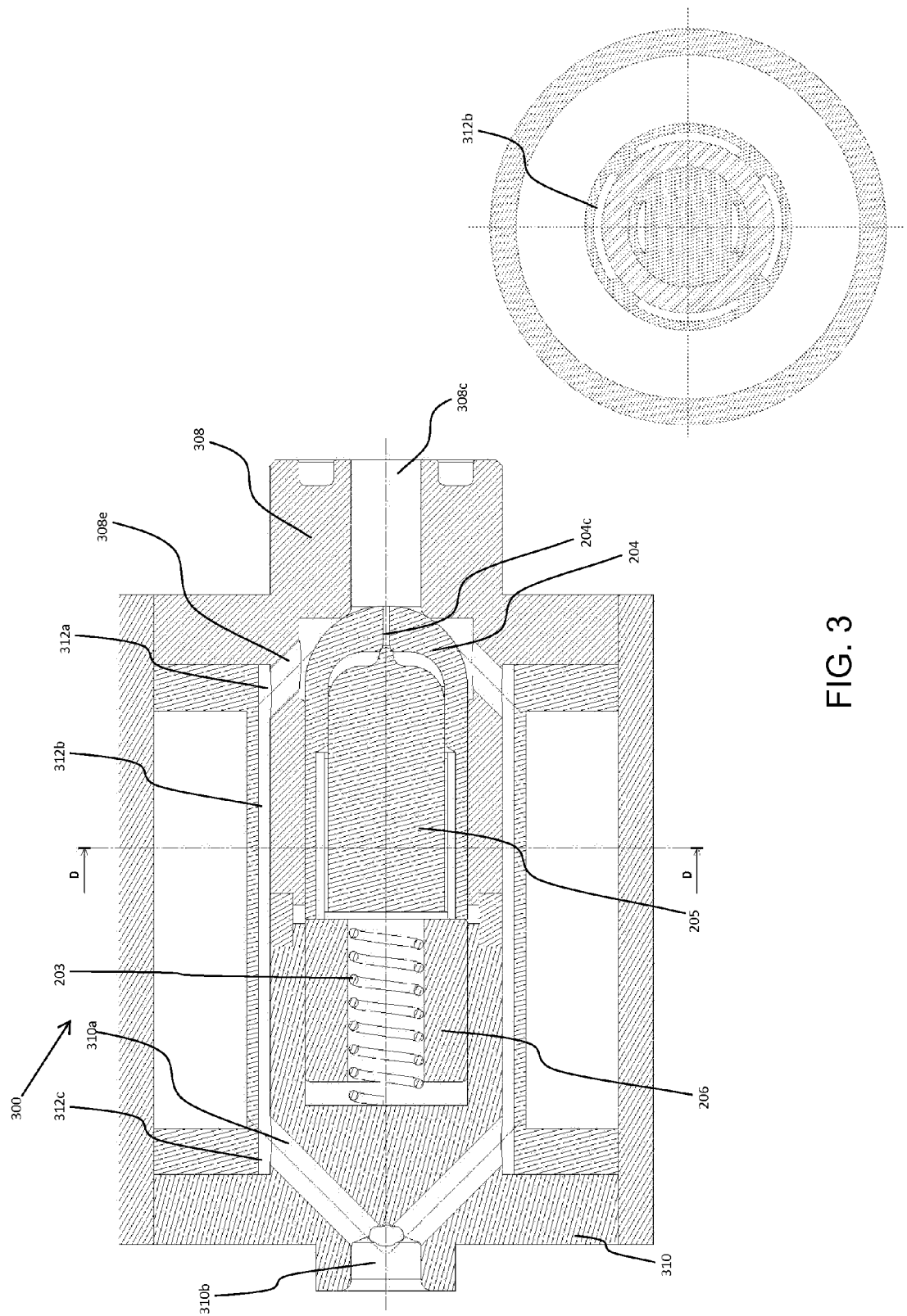
Figure 4:
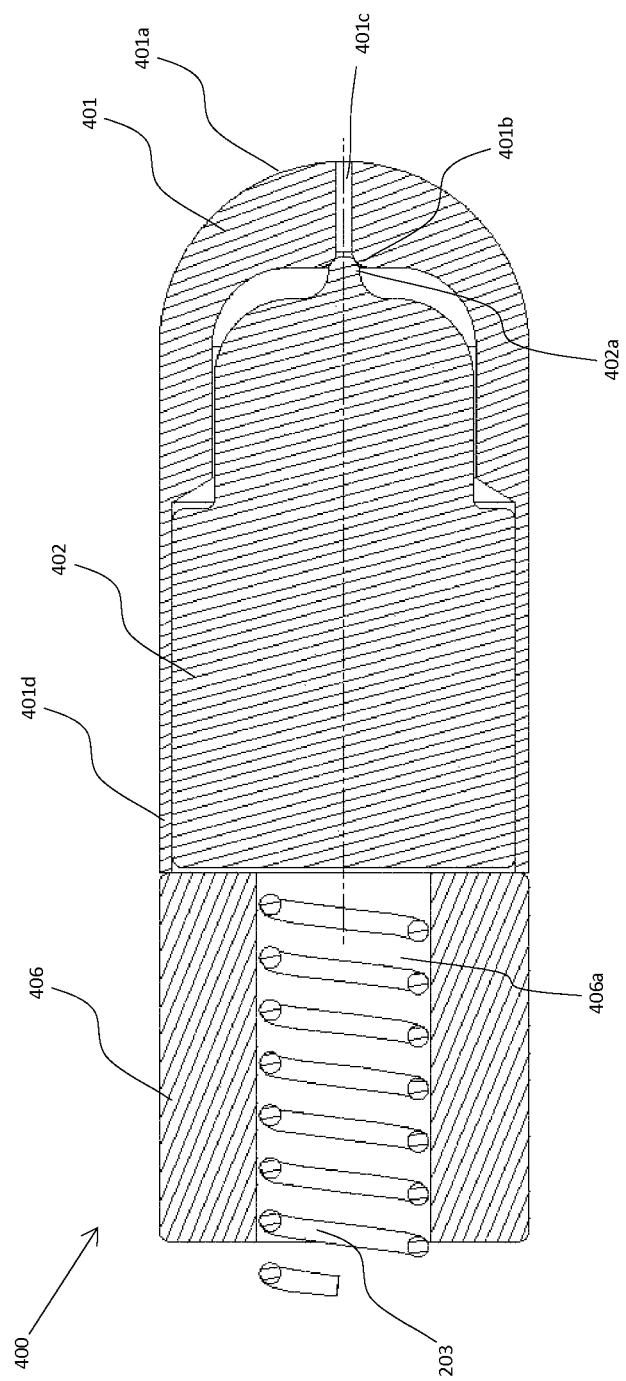
Figure 5:
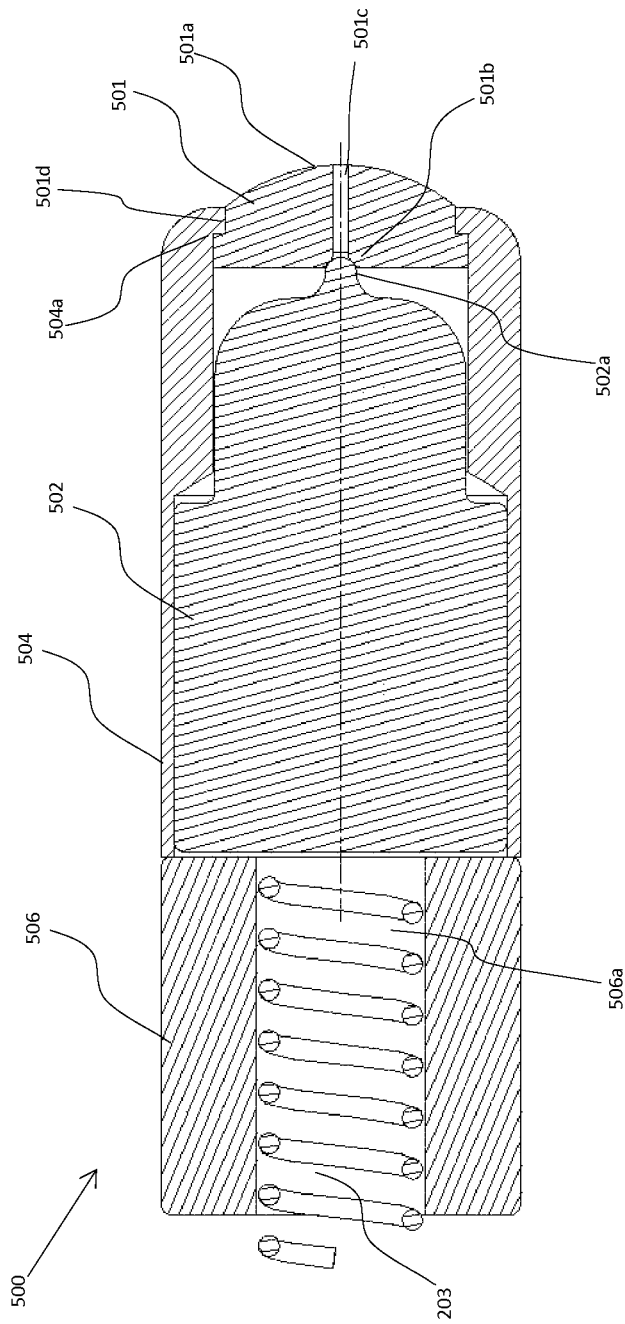
Figure 6:
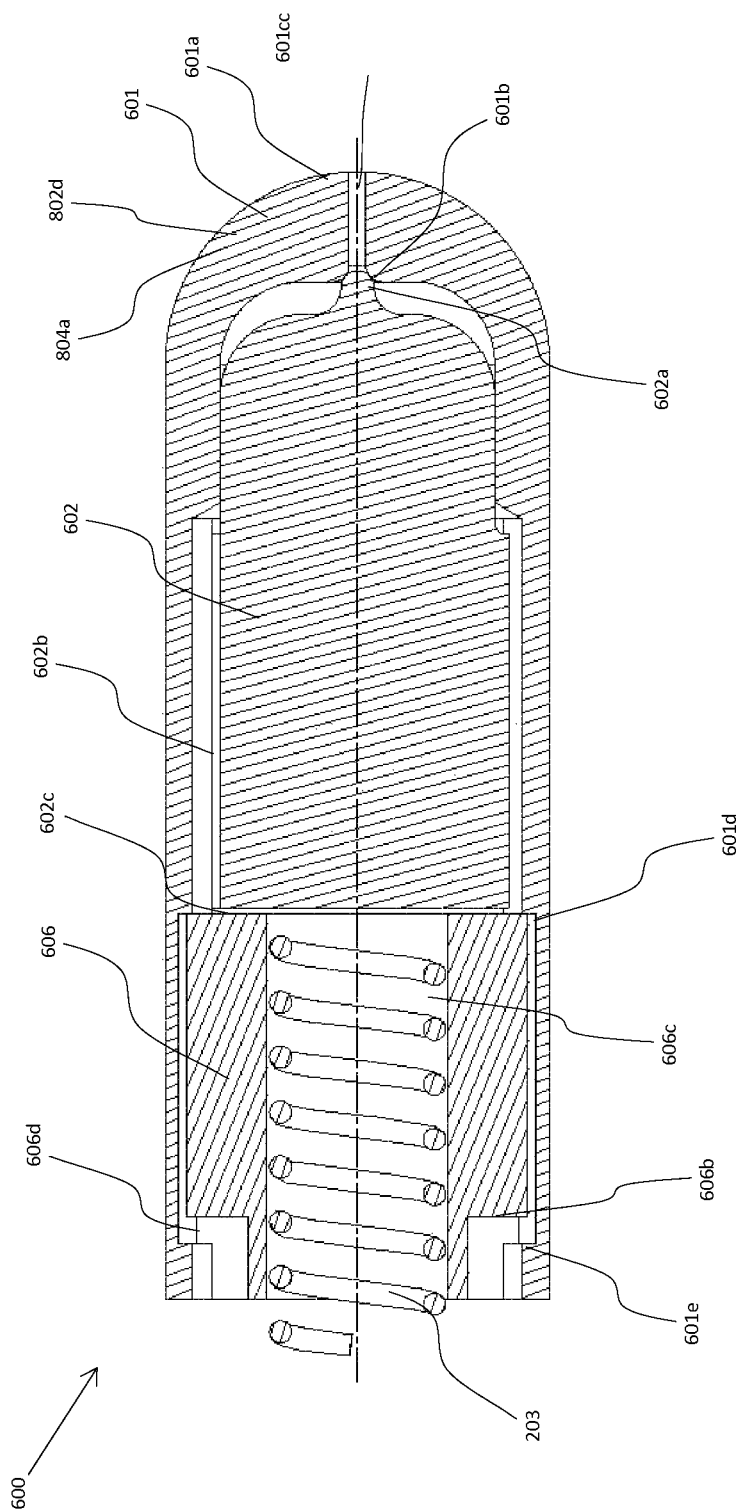
Figure 8:
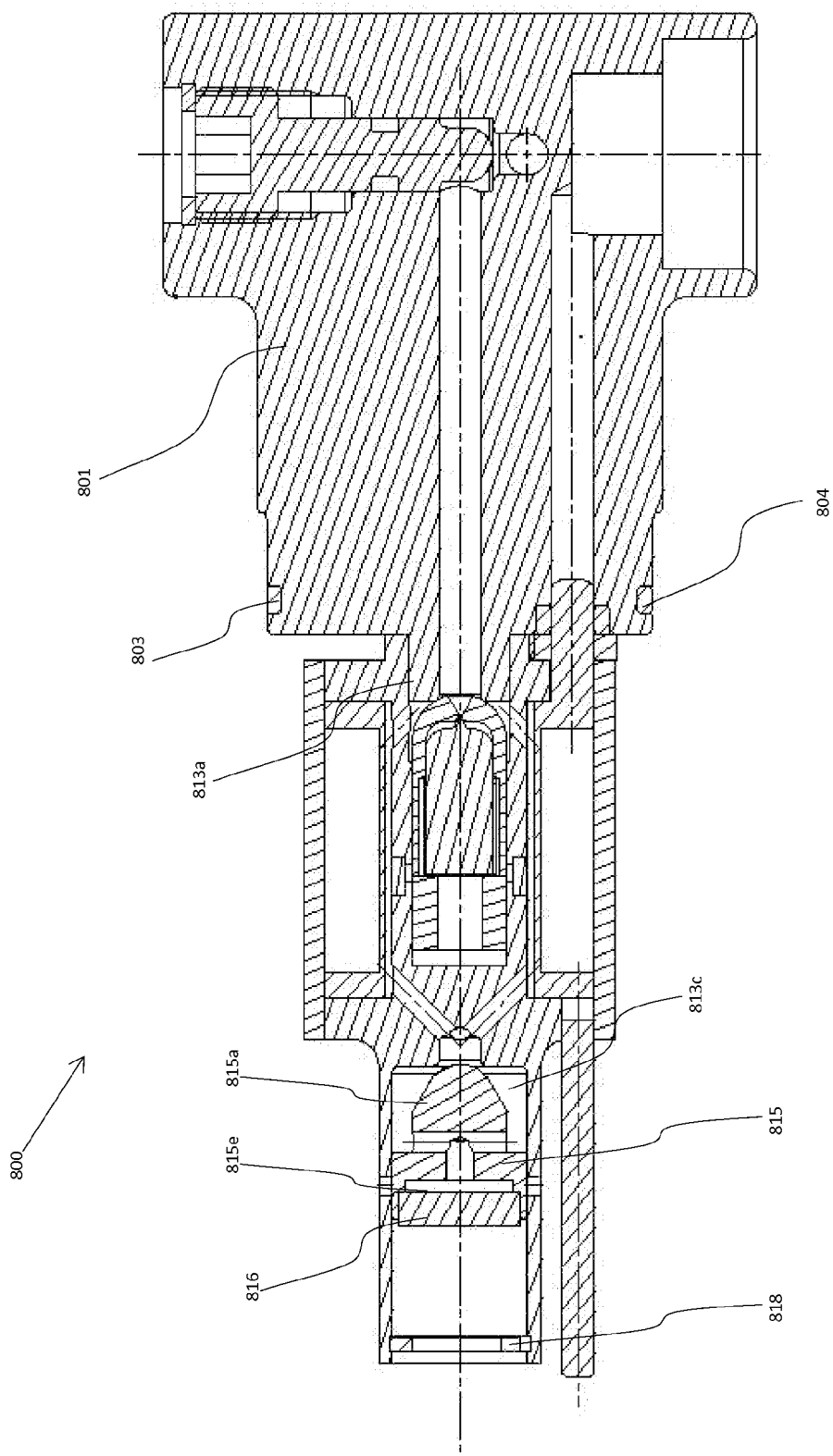
Figure 9:
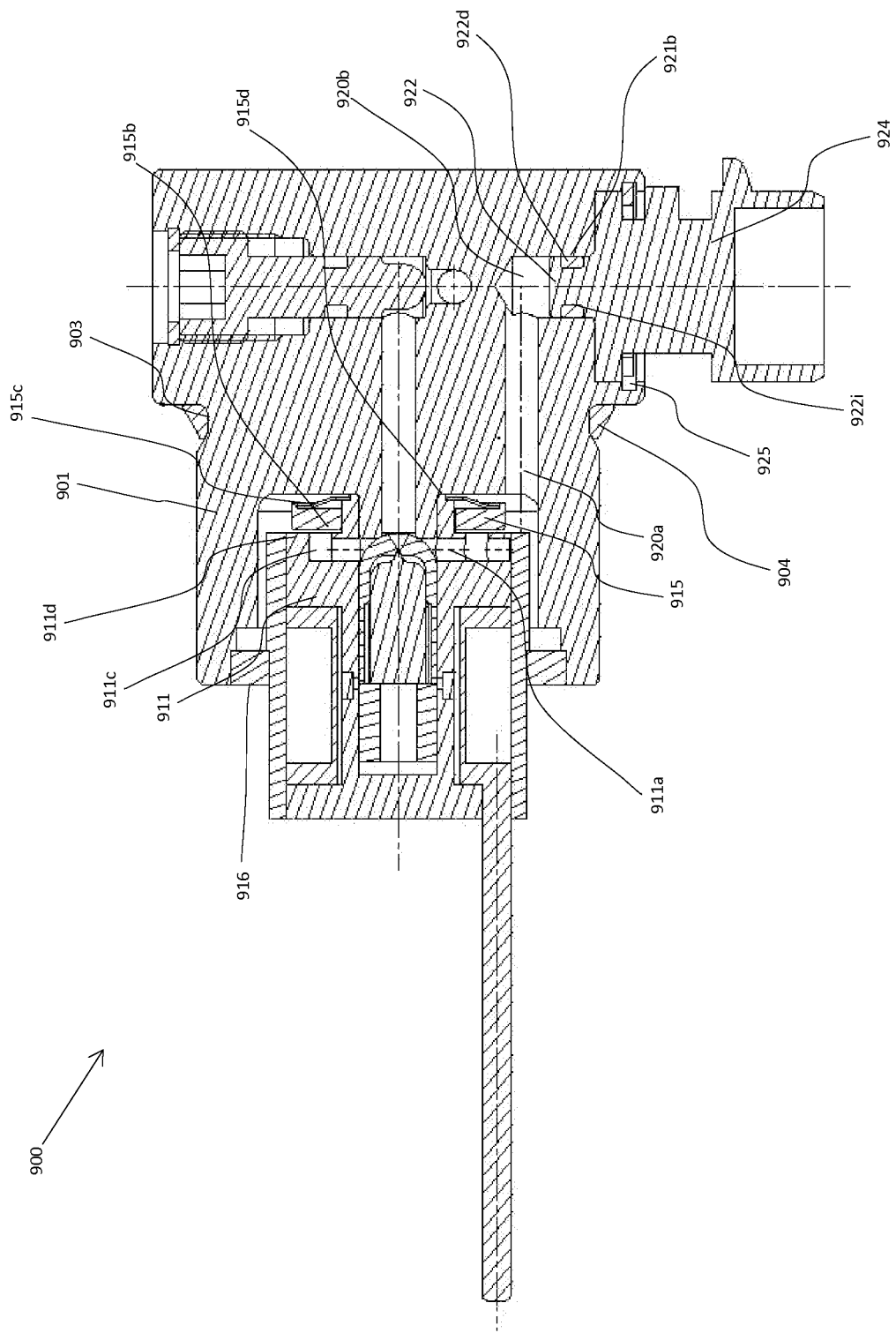
Figure 10:
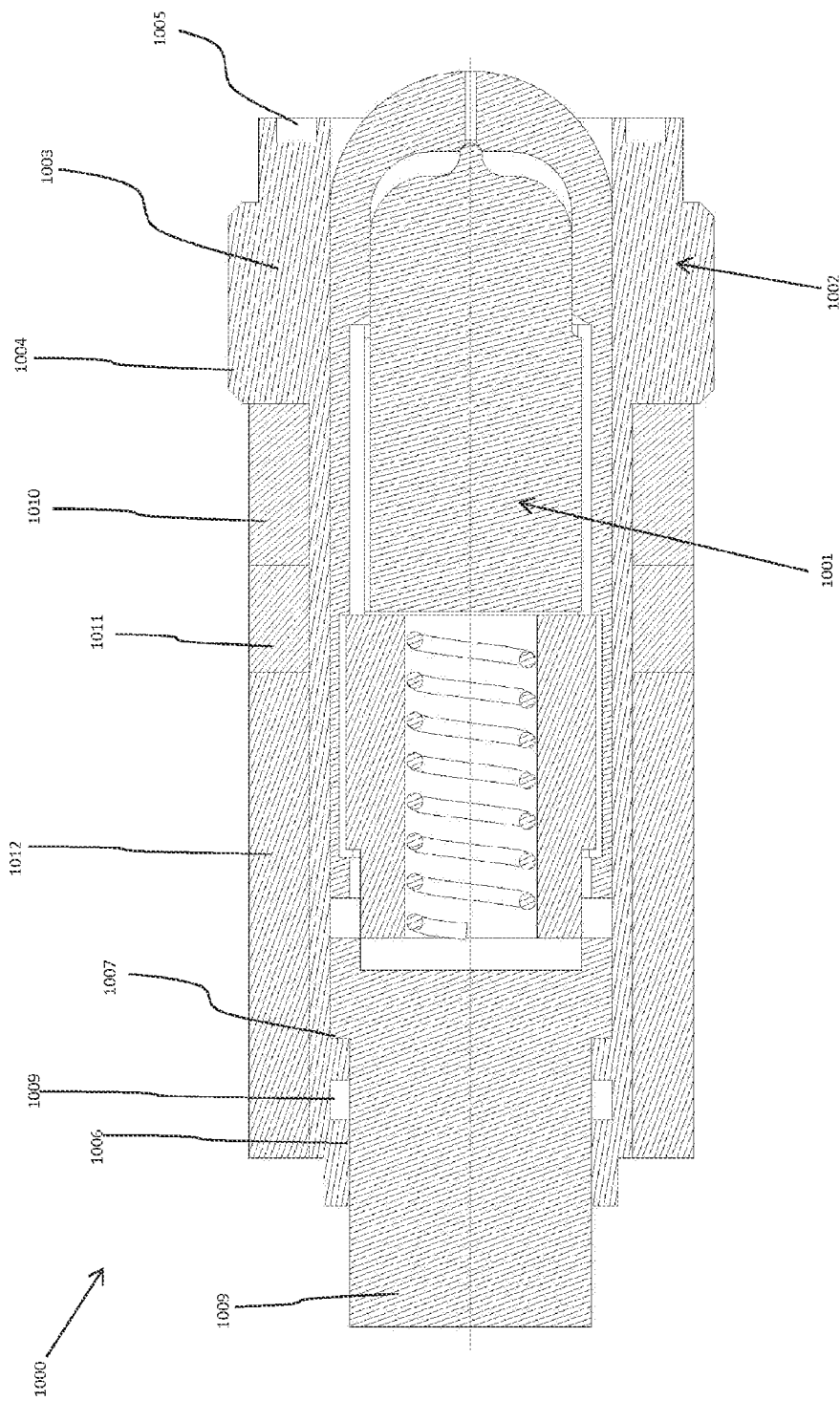

Several exemplary embodiments of the invention are described in greater detail below with reference to the drawings, wherein:

FIG. 1 shows a schematic illustration of a fuel supply system of a gas-fuel motor vehicle, FIG. 2 shows an electromagnetic valve according to a first embodiment, in the closed position, FIG. 2.1 shows an electromagnetic valve according to a first embodiment, with the pilot hole open, FIG. 2.2 shows an electromagnetic valve according to a first embodiment, with the inlet open, FIG. 3 shows an electromagnetic valve according to a second embodiment, in the closed position, FIGS. 4, 5, and 6 show different magnetic armatures for an electromagnetic valve, FIGS. 7, 7.1, and 7.2 show a tank valve according to a first embodiment, FIG. 8 shows a tank valve according to a second embodiment, FIG. 9 shows a tank valve according to a third embodiment, and FIG. 10 shows an electromagnetic valve with a multi-part pressure-tight housing.

As shown in FIG. 1, a fuel supply system 100, particularly of a motor vehicle driven by gaseous fuel, has—for the supply of a consumer 101 with gaseous fuel such as natural gas, methane, biogas, hydrogen, or the like—one or more storage tanks 102 with a tank valve 103 and an electromagnetic valve 200, which are supplied with fuel gas during the tank filling process via a filling coupling 104 arranged on the filling side, and has an integrated non-return valve and filter, and a gas feed line 105 connected to the same which supplies the consumer 101 with fuel gas via a regulator device 106 consisting of at least one pressure regulator which reduces the pressure of the stored gas from the storage pressure to the working pressure.

As shown in FIG. 2, the electromagnetic valve 200 has—in one preferred embodiment—a multi-part magnetic armature 201, a multi-part magnet coil 202, and preferably a spring as an elastic element 203 for the purpose of closing and/or releasing the inlet 208*c* to the high-pressure chamber 102*a* of the storage tank 102. The magnetic armature 201 has a seal element 204 consisting of a suitable seal material, having a primary seal surface 204*a* for the purpose of sealing against the seal surface 208*d* of the valve fastening 208, having a pilot seal surface 204*b* for the purpose of sealing against the associated pilot seal surface 205*a* of the armature 205, and having a bore hole 204*c* between the pilot seal surface 204*b* and the primary seal surface 204*a*, and having a support 204*d* for the purpose of supporting the counter pole 206 on the seal element 204, having a magnetizable armature 205 with a pilot seal surface 205*a* for the purpose of sealing against the associated pilot seal surface 204*b* and grooves 205*b* for accommodating the support 204*d*, having a magnetizable, moving counter pole 206 which abuts the support 204*d* and which has an internal bore hole 206*a* for accommodating the elastic element 203. The elastic element 203 presses the armature 205 against the seal element 204 and the seal element 204 against the seal surface 208*d*, and closes the flow path between the inlet 208*c* and the high-pressure chamber 102*a* of the storage tank 102, when there is no flow and the magnetic coil 202 is not excited. The first working air gap 205*c* of the magnetic system is found between the armature 205 and the counter pole 206, and the second working air gap 206*b* of the magnetic system is found between the counter pole 206 and the closure plate 210. The magnetic coil 202 has a multi-part internal guide 207 consisting of a magnetizable valve fastening 208 with a suitable fastening threading 208*a* for the purpose of fastening the electromagnetic valve 200 in the housing the storage tank 103, a groove 208*b* for accommodating a suitable seal for the purpose of sealing the high-pressure chamber 102*a* with respect to the inlet 208*c*, a seal surface 208*d* for the purpose of creating a seal against the associated primary seal surface 204*a*, and flow paths 208*e* to the high-pressure chamber 102*a* of the storage tank 102, a non-magnetizable spacer piece 209 for carrying the magnetic field, and a magnetizable closure plate 210. The magnetic coil 202 further has a coated magnet winding 211 made of a winding form 212 which receives a winding (copper wire) and a magnetizable external guide 214 to connect the individual parts of the magnetic coil 202 and the electromagnetic valve 200.

As shown in FIG. 2, when the magnetic coil 202 is not excited, and there is no flow, the elastic element 203 presses the armature 205 of the pilot seal surface 205*a* against the associated pilot seal surface 204*b* and the primary seal surface 204*a* against the seal surface 208*d*, and therefore closes the connection between the high-pressure chamber 102*a* of the storage tank 102 and the inlet 208*c*. In this operating mode, a first working air gap 205*c* is present between the armature 205 and the counter pole 206.

As shown in FIG. 2.1, at the start of flow [out of the tank], a magnetic field is established by directing current to the magnetic coil 202, via the magnetizable parts of the magnetic armature 201, the working air gap 205*c*, the magnetizable parts of the inner guide 207, and the external guide 214 of the magnetic coil 202. As a result of the magnetic force at the working air gap 205*c*, the armature 205 is pulled against the force of the elastic element 203, toward the counter pole 206 supported by the seal element 204, and lifts the pilot seal surface 205a off of the associated pilot seal surface 204b. High-pressure gas from the region of the counter pole 206 can flow into the inlet 208c via the open pilot hole 204c until pressure equilibrium is reached.

As is shown in FIG. 2.2, a pressure differential is created as a result of the flow of high-pressure gas from the region of the counter pole 206 via the open pilot hole 204c, which presses the magnetic armature 201 against the spring force of the elastic element 203 onto the closure plate 210, and lifts the primary seal surface 204a off of the associated seal surface 208d, opening the flow path from the high-pressure chamber 102a of the storage tank 102 to the inlet 208c.

When the current is switched off, the magnetic field in the electromagnetic valve 200 is dissipated, and the elastic element 203 slides the armature 205 with the seal element 204 into the closed position as shown in FIG. 3, and the counter pole 206 is carried with it into the closed position due to the magnetic force still present. When the bore hole 204c is closed, the closing action is reinforced by the pressure difference established via the magnetic armature 201.

As shown in FIG. 3, the electromagnetic valve 200 has, in a further embodiment, a valve fastening 308 with flow paths 308e for guiding the flow in the valve fastening 308, has a valve closure 310 with flow paths 310a for guiding the flow in the valve closure 310, which open into a flow path 310b, and has a winding form 312 with a collector 312a on the input end thereof, a flow path 312b, and a collector 312c on the output end. When the electromagnetic valve 300 is open, the high-pressure gas flows from the inlet 308c into the high-pressure chamber 102a of the storage tank 102 via the flow paths 308e, 312a, 312b, 312c, 310a, and 310b.

As shown in FIG. 4, a magnetic armature 400 according to a further embodiment has a seal element 401 made of a suitable seal material, having a primary seal surface 401a for creating a seal against the associated seal surface 208d of the magnetic coil 202, has a pilot seal surface 401b for creating a seal against the associated pilot seal surface 402a of the armature 402, has a bore hole 401c between the pilot seal surface 402a and the primary seal surface 402b, has a support 401d for supporting the counter pole 403 on the seal element 401, has a magnetizable armature 402 with a pilot seal surface 402a for creating a seal against the associated pilot seal surface 401b, and has a magnetizable, movable counter pole 406 which abuts the support 401d, with an internal bore hole 406a for receiving the elastic element 203.

A shown in FIG. 5, a magnetic armature 500 according to a further embodiment has a seal element 501 consisting of a suitable seal material, having a primary seal surface 501a for creating a seal against the associated seal surface 208d of the magnetic coil 202, having a pilot seal surface 501b for creating a seal against the associated pilot seal surface 502a of the armature 502, a bore hole 501c between the primary seal surface 502a and the pilot seal surface 502b, and a projection 501d received in the support 504, a support 504 for accommodating the seal element 501 and supporting the counter pole 503, and a magnetizable armature 502 with a pilot seal surface 502a for creating a seal against the associated pilot seal surface 501b, and a magnetizable, moving counter pole 506 which abuts the support 504, having an internal bore hole 506a for accommodating the elastic element 203.

As shown in FIG. 6, a force pilot operated magnetic armature 600 according to a further embodiment has a seal element 601 consisting of a suitable seal material having a primary seal surface 601a for creating a seal against the associated seal surface 208d of the magnetic coil 202, having a pilot seal surface 601b for creating a seal against the associated pilot control surface 602a of the armature 602, having a bore hole 601c between the primary seal surface 602a and the pilot seal surface 602b, having a support 601d for supporting the counter pole 603 on the seal element 601, and a carrier 601e for carrying by means of the counter pole 603, and a magnetizable armature 602 with a pilot seal surface 602a for sealing against the associated pilot seal surface 601b, and a magnetizable, moving counter pole 606 which abuts the support 601d, having an internal bore hole 606a for accommodating the elastic element 203 and a carrier 606b for carrying the seal element 601. The first working air gap 602c and the carrier air gap 606d are formed between the seal element 601 and the counter pole 606, and the second working air gap 206b is formed between the counter pole 606 and the closure plate 210.

The force pilot control via the carriers 601e and 606b lifts the seal element 601, additionally to the pressure forces on the individual parts of the magnetic armature 600 resulting from the magnetic force present, off of the associated seal surface 208c.

The invention further comprises an electrical passage with a projection with electrical pins, with a seal geometry comprising various different diameters. As shown in FIG. 7, FIG. 7.1, and FIG. 7.2, the tank valve 700 has a housing 701 with a fastening threading 702 for fastening the tank valve 700 in a suitable recess of the storage tank 102, and a groove 703 for accommodating a suitable seal 704 for sealing the high-pressure chamber 102a of the storage tank 102 with respect to the surroundings, with the high-pressure connections 706a and 706b, having the threaded connections 707a and 707b and seal grooves 708a and 708b for accommodating a suitable seal 709a and 709b for direct connection of the high-pressure lines and sealing the flow path 710a with respect to the environment with the subsequent flow path 710b, and the fuel inlet 710c between the inlets 706a, 706b and the high-pressure chamber 102a of the storage tank 102 with the opening 711 in between, with associated fastening threading 711a, seal surface 711b, seal surface 711c, and groove 711d for accommodating the manual check valve 712 for manually closing the storage tank 102, having a valve body 712a with a fastening threading 712b for engaging with the fastening threading 711a, a groove 712c for accommodating a suitable seal 712d for creating a seal with respect to the surroundings on the seal surface 711c, a seal surface 712e for sealing the flow path 710b with 710c on the seal surface 711b, a tool recess 712f for receiving a tool for installation, for opening, and/or for closing the flow path, and the retaining ring 712g supported in the groove 711d to prevent undesired unscrewing of the manual check valve 712 upon opening, and the opening 713 in between, with associated valve fastening 713a and seal surface 713b for accommodating the electromagnetic valve 200 for sealing and for opening the storage tank 102 electromagnetically, the flow paths 715a and 715b accessible from the interior between the surroundings and the high-pressure chamber 102a with associated support surface 715c and seal surface 715d for accommodating the thermal protection 716 to prevent the tank from bursting as a result of the application of heat, having a fluid-filled glass ampoule 716a with a pre-determined bursting temperature, supported on the support surface 715c, and a valve body 716b which is supported by means of the support surface 716c on the glass ampoule 716a, and a groove 716d for accommodating a suitable seal 716e to create a seal with respect to the surroundings on the seal surface 715d, and the projection 716f to prevent undesired outward migration of the valve body 716b from the flow path 715a, the flow paths 717a and 717b between the flow path 710a and the high-pressure chamber 102a with the opening 718 in between, with associated fastening threading 718a, seal surface 718b, seal surface 718c, and groove 718d for accommodating a manual service valve 719 for the purpose of manually emptying the storage tank, such as the manual check valve having a valve body 712a with a fastening threading 712b for engaging with the fastening threading 718a of the opening 718, a groove 712c for accommodating a suitable seal 712d for creating a seal with respect to the surroundings on the seal surface 718c of the opening 718, a seal surface 712e for sealing the flow path 717a with 717b on the seal surface 718b of the opening 718, a tool recess 712f for accommodating a tool for the installation, opening, and/or closing of the flow path, and the retainer ring 712g for support in the groove 718d of the opening 718, to prevent undesired unscrewing of the manual service valve 719 upon opening, the connection paths 720a and 720b between the surroundings and the high-pressure chamber 705 of the storage tank with the interior opening 721, support surface 721a and seal surface 721b for accommodating the pressure-tight electrical passage 722, having a cylindrical projection 722a as a part of the coating of the magnetic coil, with support surface 722b for the potential supporting [thereof] on the support surface 721a of the connection path 720a, seal surface 722c with seal 722d for sealing the high-pressure chamber 201a with respect to the surroundings against the seal surface 721b, and the individual pins 722e embedded in the projection 722a, with connection ends 722f and 722g on both sides for fastening the electrical connection lines for the purpose of relaying the electrical signals to the magnetic coil of the electromagnetic valve 200, and to the temperature sensor 717, and seal geometry 722h in between, which forms a meandering leakage path by means of different diameters, and compensates different thermal expansions, and the external opening 723 for accommodating the electrical connector plug 724 [sic]. The electromagnetic valve 200 has, connecting to the flow path 310b, an opening 713c with seal surface 713d, cross holes 713e, a filter recess 713f for accommodating a flow restrictor 715, having a valve body 715a which is guided in the opening 713c and held in position by two spring elements 715b and 715c, such that the seal surface 715d of the flow restrictor 715 does not form a seal with the seal surface 713d, the connection of the flow path 310b is open to the opening 713c, and the cross holes 713e of the opening 713c is [sic] closed by the valve body 715a. The valve body 715a further comprises an internal bore hole 715e with connecting cross holes 715f as the connection between the filter 716, which is pressed into the opening 713f, and the opening 713c. The temperature sensor 717 is integrated into the magnetic coil 202.

As shown in FIG. 8, a second embodiment for the housing 801 of the tank valve 800 has a groove 803 for a radial seal 804, and does not accommodate the electromagnetic valve in an opening of the valve housing, as in FIG. 2, but rather on the attachment 813a of the housing 801 on the end face and interior of the storage tank. As with the flow restrictor 715, the flow restrictor 815 has a valve body 815a with an opening 815e for accommodating the filter 816. The rear-facing spring 815c of the flow restrictor 815 is supported on the retainer 818 of the closure plate 310.

As shown in FIG. 9, the housing 901 of the tank valve 900 in a further embodiment has a groove 903 for a seal 904 at the transition of the threading to the housing part which projects out of the storage tank. The electromagnetic valve 200 has a puncture 911b to guide the flow. The disk-shaped flow restrictor 915 is held in position via a spring element 915c which is supported in a suitable groove 915d of the flow restrictor 915, and seals the seal surface 915b to the associated seal surface 911d of the valve fastening 208 when necessary. In a further embodiment, the electrical connector plug 924 comprises the electrical passage 922 which is designed with a groove 922i and which accommodates the seal 922d which creates a seal with the associated seal surface 921b of the connection 920b. The electrical connector plug is held in a suitable groove of the housing 901 by a retaining ring 925.

As shown in FIG. 10, the electromagnetic valve 1000 has a multi-part magnetic armature 1001 according to the above description, and a multi-part pressure-tight housing 1002 for the construction, the same being internal or external to the tank valve, having a housing 1003 for guiding the magnetic armature 1001 in an axial motion, and a sealing, magnetizable closure plate 1008. In this case, the housing 1003 has a suitable fastening threading 1004 for the installation of the valve in the tank valve 103, and a groove 1005 for accommodating a suitable seal ring for sealing the pressurized valve interior with the container valve 103, and a recess bore hole 1006 with support 1007 for supporting the closure plate 1008, and a seal groove 1009 for accommodating a suitable seal for sealing with the associated seal surface of the closure plate 1008 [sic]. In this case, the housing 1003 can be a non-magnetizable housing. For the purpose of maintaining pressure and guiding the magnetic field, the thin-walled, pressure-bearing housing 1003 has a magnetizable first reinforcement 1010, a non-magnetizable second reinforcement 1011, and a magnetizable third reinforcement 1012, each of which can be positioned on the outside. The first reinforcement 1010, the third reinforcement 1012, and the closure plate 1009 are in contact with the guide of the magnetic coil, and conduct the magnetic field to and/or from the magnetic armature 1001.

In a further embodiment, the filling of the tank can take place via the regulator device.

In a further embodiment, the filling coupling can be arranged directly on the tank valve.

In a further embodiment, the electromagnetic valve can be press-stamped with the housing of the tank valve.

In a further embodiment, the seal element of the electromagnetic valve can create a seal with a suitable seal surface of the housing of the tank valve.

In a further embodiment, a suitable seal can be installed on the seal element of the magnetic armature to reduce the leakage current between the valve fastening and seal element.

In a further embodiment, a second elastic element can be installed which is supported on the counter pole and which presses the counter pole against the seal element.

In a further embodiment, the flow paths of the closure plate can be designed as axially parallel to the flow restrictor.

In a further embodiment, the intermediate piece of the magnetic coil can be left out of the configuration.

In a further embodiment, the winding form of the magnetic coil can be designed without rods.

In a further embodiment, the magnetic coil can be coated on the outside.

In a further embodiment, the housing of the tank valve can be designed with a suitable threading fitting having a threading, for connecting the high-pressure lines.

In a further embodiment, the housing of the tank valve can be designed with a high-pressure connector.

In a further embodiment, the manual check valve can be designed as opposite and parallel to the high-pressure connector in cases where the housing of the tank valve is designed with a high-pressure connector.

In a further embodiment, the mechanical check valve can be designed as a multi-part component with a suitable seal element for closing off the flow path.

In a further embodiment, the housing of the tank valve can be designed with its own connector for a safety line intended to remove the stored gas after the thermal protection opens the flow path.

In a further embodiment, the housing of the tank valve can be designed with a fastening threading and suitable seal surface for the purpose of installing an external thermal protection as a closed, boltable part.

In a further embodiment, the electrical passage can be designed as a separate part.

In a further embodiment, the pins of the electrical [sic] can be designed with no seal geometry.

In a further embodiment, the pins of the electrical passage can be press-stamped.

In a further embodiment, the electrical lines of the temperature sensor and of the magnetic winding are guided without pin(s) directly through the electrical passage.

In a further embodiment, a loose cable can be designed with an attached electrical plug for the purpose of relaying a signal externally.

In a further embodiment, the flow restrictor can be designed as a stand-alone part which is connected to the outlet of the electromagnetic valve in a suitable manner.

In a further embodiment, the flow restrictor is positioned by means of a spring.

In a further embodiment, the filter can be designed as a stand-alone part which is connected to the outlet of the electromagnetic valve in a suitable manner.

In a further embodiment, the individual elements can be positioned in a different order in the direction of flow.

In a further embodiment, the closure plate of the pressure-bearing valve housing can be fastened by means of a fastening threading in the housing, and/or can comprise the seal groove.

In a further embodiment, the pressure-bearing valve housing has a magnetizable first reinforcement and non-magnetizable second reinforcement.

Further embodiments are created by the combination of the embodiments listed above.

The invention claimed is:

1. An electromagnetic valve for a tank valve of a fuel supply system of a gas fuel motor vehicle, comprising:
    a magnetic coil with an inner guide;
    a magnetic armature which can move axially in the inner guide,
    wherein the magnetic armature consists of an armature, a seal element which is arranged between the armature and a fuel inlet, and a moveable counter pole which abuts the seal element;
    wherein the seal element, the armature and the moveable counter pole are guided through the inner guide of the magnetic coil;
    wherein the seal element has a support that supports the counter pole on the seal element and the armature has grooves for accommodating the support such that the counter pole abuts the support;
    wherein the magnetic coil and the magnetic armature are arranged in such a manner that, when the magnetic coil is activated, a pilot opening for a high-pressure fuel is opened by means of the armature sliding in the direction of the moveable counter pole and by means of the armature being released from the seal element so that the high-pressure fuel from the region of the moveable counter pole flows into the gas inlet via the pilot opening; and
    wherein subsequently a primary opening for the high-pressure fuel is opened by means of the magnetic armature sliding in the direction of a closure plate of the magnetic coil and by means of the seal element releasing from the fuel inlet due to a pressure difference created as a result of the flow of the high-pressure fuel from the region of the moveable counter pole.

2. An electromagnetic valve according to claim 1, wherein the armature and the moveable counter pole enclose a first working air gap which functions to open the pilot opening and
    wherein the moveable counter pole and the closure plate of the magnetic coil enclose a second working air gap which functions to open the primary opening.

3. An electromagnetic valve according to claim 2, wherein the first working air gap is smaller than the second working air gap, and preferably has between 50 and 0.5%, and more preferably between 25 and 0.01%, of its length.

4. An electromagnetic valve according to claim 1, wherein the pilot opening has a smaller flow cross-section than the primary opening which is preferably between 25 and 0.05%, and more preferably between 15 and 1% of the flow cross-section of the primary opening.

5. An electromagnetic valve according to claim 1, wherein a pilot lifting movement to open the pilot opening is independent of a primary lifting movement to open the primary opening.

6. An electromagnetic valve according to claim 1, wherein the magnetic coil has a fastening component in the inner guide, an external guide, and a magnetic winding.

7. An electromagnetic valve according to claim 1, wherein the seal element at least particularly surrounds the armature.

8. An electromagnetic valve according to claim 1, wherein the seal element at least particularly surrounds the moveable counter pole.

9. An electromagnetic valve according to claim 1, wherein the seal element has a primary seal surface for creating a seal with a seal surface of the fastening component of the guide, and a pilot seal surface for creating a seal with a pilot seal surface of the armature.

10. An electromagnetic valve according to claim 1, wherein the seal element has a primary seal surface for creating a seal with a seal surface of the housing, and a pilot seal surface for creating a seal with a pilot seal surface of the armature.

11. An electromagnetic valve according to claim 1, wherein the seal element has a bore hole between the pilot seal surface and the primary seal surface, and a support for supporting the moveable counter pole on the seal element.

12. An electromagnetic valve according to claim 1, further comprising an elastic element which presses the armature against the seal element and the seal element against the seal surface when the magnetic coil is not excited.

13. An electromagnetic valve according to claim 1, comprising having an elastic element which presses the moveable counter pole against the seal element.

14. An electromagnetic valve for a tank valve according to claim 1, wherein the tank valve comprises one of the following elements: a manual check valve, a thermal protection, a burst protection, a manual service valve, a flow restrictor, a filter element, a temperature sensor, an electrical passage.

15. A multi-part, pressure-tight housing for an electromagnetic valve for a tank valve according to claim 14 of a fuel supply system of a gas fuel motor vehicle, comprising:
    a housing to guide the axial movement of the magnetic armature;
    a magnetizable closure plate;
    a magnetizable first reinforcement;
    a non-magnetizable second reinforcement; and
    a magnetizable third reinforcement, wherein the reinforcements ensure the radial pressure resistance of the housing and conduct the magnetic field to the magnetic armature.

16. A tank valve according to claim 14, comprising at least one of the following elements integrated into the electromagnetic valve: a flow restrictor, temperature sensor, filter element, electrical passage.

17. A fuel supply system having an electromagnetic valve according to claim 1, which is arranged in a high-pressure chamber of a fuel storage tank.

18. A flow restrictor according to claim 16, comprising a valve body with an integrated filter element.

\* \* \* \* \*